Sept. 15, 1936.  E. J. VON PEIN  2,054,184
SCALE
Filed Jan. 8, 1932  2 Sheets-Sheet 1

INVENTOR-
Edward J. Von Pein
BY
ATTORNEY-

Sept. 15, 1936.   E. J. VON PEIN   2,054,184
SCALE
Filed Jan. 8, 1932   2 Sheets-Sheet 2
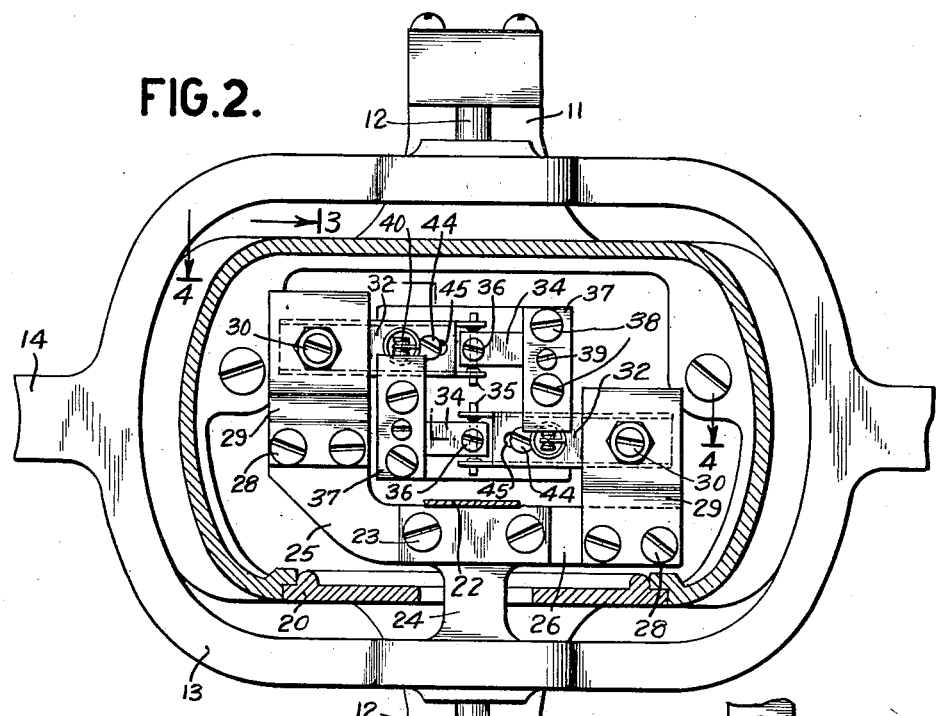
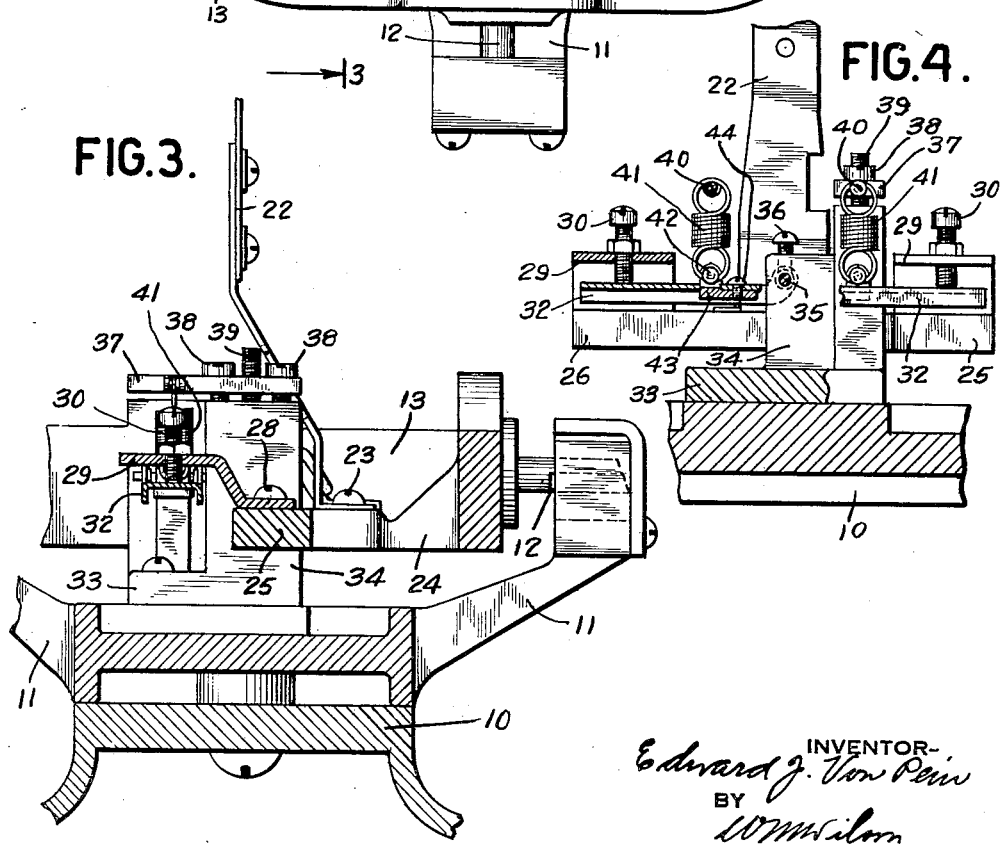
INVENTOR-
Edward J. Von Pein
BY
W M Wilson
ATTORNEY- Patented Sept. 15, 1936

2,054,184

UNITED STATES PATENT OFFICE 2,054,184

SCALE

Edward J. Von Pein, Dayton, Ohio, assignor, by mesne assignments, to The Hobart Manufacturing Company, Troy, Ohio, a corporation of Ohio Application January 8, 1932, Serial No. 585,471

7 Claims. (Cl. 265—59)

This case relates to weighing scales particularly of the even balance or "over" and "under" type.

The object of the invention is to provide improved counterbalance devices for a scale of the even balance type.

The object is further to provide coil spring counterbalances adjustably associated with a rocking beam to act independently on the beam in resisting movement thereof.

Still further, an object is to provide a lever connection between a rocking beam and a counterbalance spring.

Another object is to provide coil spring resistants which do not begin to act on the beam until the latter departs from normal, neutral, or zero position.

Further and other objects and advantages will be hereinafter set forth in the accompanying specification and claims, and shown in the drawings, which by way of illustration show what is now considered to be the preferred embodiment of the invention.

In the drawings:

Fig. 2 is a section on line 2—2 of Fig. 1;

Fig. 3 is a section on line 3—3 of Fig. 2, and

Fig. 4 is a section on line 4—4 of Fig. 2.

Figure 1:
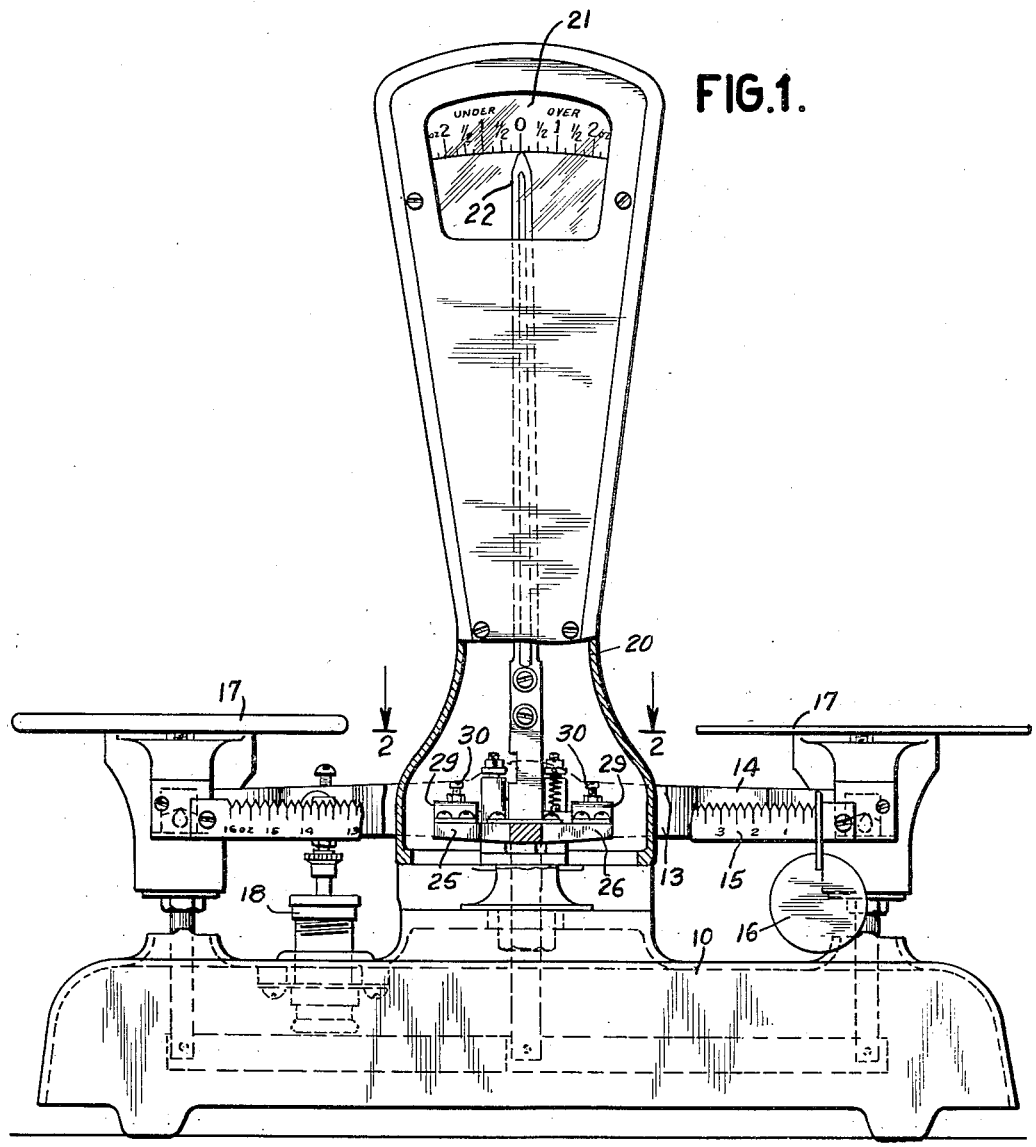
Fig. 1 is a front elevation of the scale with part of the housing broken off to show interior parts.

Referring to the drawings in detail, the scale comprises a base housing or frame 10 having fulcrum standards 11 at each side for supporting the knife edges 12 fixed in opposite sides of the central loop 13 of the even balance beam 14.

The beam 14 has secured thereto the usual tare bar 15 carrying poise 16. Each end of the beam supports a pan 17, one of which may be used to support a load while the other may be used to carry drop weights. A dash pot 18 is provided to dampen the oscillations of the beam. Extending upwardly from base 10 through loop 13 is the fan housing 20 having at its upper end a visible "under" and "over" chart 21 coacting with a pointer 22 fixed at its lower end by screws 23 to a horizontal bracket 24 integral with one side of the loop 13 and projecting inwardly from a central point of this side of the loop into housing 20. Bracket 24 divides into two arms 25 and 26 which are on opposite sides of the beam fulcrums and in effect comprise extensions of opposite arms of the beam.

Fixed by screws 28 to each arm is a bent bracket 29 into which is threaded a screw 30 the lower end of which is adapted to engage a pivoted plate 32.

Base 10 carries centrally thereof an anchor block 33 having two integral pillars 34 extending upwardly between brackets 29. Pillars 34 carry pivot pins 35 for plates 32, the pins being fixed in position by set screws 36. The axes of pins 35 are coincident with the axis of the beam 14 as may be seen from Figs. 2 and 3 for a purpose which will be hereinafter brought out.

Secured to the top of each pillar 34 is a plate 37 through which freely pass a pair of screws 38 threaded into the pillar. Intermediate screws 38 is a screw 39 threaded into plate 37 and bearing on the top of the pillar. In adjusting plate 37, screws 38 and 39 must be jointly operated. Thus, if it is desired to raise the plate, screws 38 are turned to provide clearance between their heads and the top of plate 37 thus determining the upper position of the plate and screw 39 then turned to bear against the pillar, thus holding the plate against downward movement.

By reason of the opposing tendencies of screws 38 and 39, the plate 37 when adjusted is securely retained in position. Further, micrometer adjustments of plate 37 may be obtained in the following manner due to the slight clearance between the stems of screws 38 and the holes in the plate through which they pass. Thus to slightly raise the left hand end of plate 37 (Fig. 3), the right hand screw 38 may be turned down and the left hand screw 38 relieved to the same extent. The plate 37 will then pivot clockwise at the point of engagement between screw 39 and the top of pillar 34.

Plate 37 has a grooved pin 40 which is engaged by the upper loop of a spring 41, the lower loop of which engages a grooved pin 42 provided on a plate 43. The plate 43 is clamped to the lever 32 by means of a screw 44 threaded into the plate and passing through a slot 45 in the lever 32 extending lengthwise of the latter. By loosening screw 44, the plate 43 may be adjusted lengthwise of lever 32 for a purpose hereinafter explained.

In sealing the scale, a spring resistant device or assembly at one side of the beam and consisting of plate 37, spring 41, plate 43, lever 32, screw 30 and bracket 29 may be considered as a separate unit, the adjustment of which has no effect on resistant assembly at the other side of the beam. In order for this to be true, however, it is necessary that screws 30 be preliminarily adjusted so as not to engage plate levers 32 at the zero or neutral position of the beam. Considering only the sealing of the left hand resistant device, as viewed in Figs. 1 and 2, the screw 30 being free of plate 32, the screws 38 and 39 are adjusted to raise or lower spring 41 and thereby correspondingly raise or lower lever 32 to position the lever horizontal and therefore parallel to the beam in neutral position.

After this adjustment screw 30 is adjusted into contact with lever 32 without causing movement of the lever. Test weights are then placed on the left hand pan 17 and the registrations of indicator 22 on the "under" portion of chart 21 noted. The plate 43 is then adjusted along lever 32 until the registrations on the chart correctly correspond to the test weights.

By placing pivots 35 of levers 32 in line with the beam fulcrum, sealing may be effected by merely adjusting plate 43 lengthwise of lever 32. This is because the levers 32 and the beam being pivoted in line with each other and caused to move together are then in effect part of a single resultant beam having a single pivot. Therefore, it follows that the load and the spring resistance may be considered as directly applied to the resultant beam with the intermediate connections between the spring and beam omitted. Accordingly, shifting of the spring to vary its moment arm on the resultant beam is the only sealing adjustment when the moment arm of the applied load and the strength of the coil spring remain the same. The mathematical proof of this is simple and thought unnecessary.

When the left hand resistant device is being adjusted, the beam will rock counterclockwise with the load on the left hand pan and consequently the right hand screw 30 will simply rise and depart from the associated lever 32 without affecting the spring 41 connected thereto. Similarly when sealing the right hand resistant device, the beam is rocked clockwise and the left hand screw 30 departs from its lever 32. In this manner, the springs act independently and one at a time in counterbalancing a load. This permits practical adjustment of the scale as otherwise it is almost impossible to seal the scale with both springs acting simultaneously, one being extended while the other is being compressed as would be the case were the screws 30 fast to levers 32.

It is also noted that by reason of levers 32 being pivoted on a line coincident with the fulcrum of the beam, these levers will rock through the same angles as the beam upon application of loads and therefore screws 30 will engage levers 32 at substantially the same point throughout the range of the beam and there will be only the slightest, substantially imperceptible sliding movement between the screw 30 and a lever 32 during extreme movements of the beam. Consequently, the frictional resistance to movement of the beam under a load due to engagement of screws 30 and levers 32 will be negligible.

As is obvious from the foregoing explanation, the right hand spring will resist only movement of the beam under influence of a resultant load on the right hand pan whereas the left hand spring functions only to resist movement of the beam under influence of a load on the left hand pan.

While the invention has been explained in connection with the embodiment particularly shown and described it is obvious that other arrangements, substitutions, and modifications, may be devised within the scope of the invention without departing therefrom. It is therefore desired to be limited only by the scope of the following claims.

I claim:

1. A scale comprising an even balance beam having a neutral position, a chart and coacting index relatively movable by the beam for indicating deflection of the beam, a plurality of tension spring resistance devices, means for causing said resistance devices to independently counterbalance movements of the beam in opposite directions from neutral, means for independently adjusting the counterbalancing effect of each spring resistance device to adjust the extent of relative movement of the index and chart for any increment of unit load on the beam, and means for independently adjusting each spring device and the first-mentioned means relatively to provide for mutual interaction only when the beam departs from neutral.

2. A scale comprising a generally horizontal beam, a coil spring counterbalancing assembly including a generally horizontal pivoted element, means operating on said element to cause the assembly to resist movements of the beam, and means for adjusting said element into substantial parallelism with the beam to move said element through the same angles as the beam.

3. A scale comprising a beam, a frame on which the beam is pivotally mounted, a spring counterbalance, an element associated with the counterbalance extending angularly thereto and pivotally connected to the frame separately and independently of the spring to be movable relative to the beam on an axis coincident with the axis of the beam, and means cooperating with the element for causing the spring to resist movement of the beam.

4. A scale comprising a beam, under and over registering means operated thereby, a coil spring, an element connected thereto, means for adjusting said element to move parallel to the beam, a device movable in accordance with the beam movements for coacting with said element to operate said spring for resisting movements of the beam, and means for adjusting said device to relieve the beam of the counterbalancing effect of the spring at neutral position of the beam.

5. In a scale, a beam, a pivot therefor, a spring, a pivoted device connected to the spring and movable on an axis coincident with the beam axis, and means coacting with the device for causing the spring to resist movement of the beam in one direction only.

6. In a scale, a beam, a pivot therefor, a frame having means for reception of said pivot, a vertically disposed coil spring, and a pivoted element operatively connected to said spring for causing the spring to vary its length in accordance with movement of the beam to resist movement of the beam under a load, said pivoted element having its pivot carried by the frame separately and independently of the spring and in the same vertical plane as the pivot of the beam.

7. A scale comprising a base structure and an even balance beam thereon rockable in opposite directions from a neutral position, a counterbalancing coil spring supported at one end from the base structure, a movable member having connection to the opposite end of the coil spring, and adjustable means on the beam movable therewith into engagement with the movable member to render the spring effective upon the beam, said adjustable means engaging the member upon movement of the beam in one direction from neutral position and remaining free of engagement therewith upon movement of the beam in the opposite direction from neutral position.

EDWARD J. VON PEIN.